Aug. 15, 1933.  W. K. NEWCOMB  1,922,707

OILING DEVICE

Filed March 1, 1932

INVENTOR.
Wallace K. Newcomb
BY
HIS ATTORNEY.

Patented Aug. 15, 1933

1,922,707

UNITED STATES PATENT OFFICE 1,922,707

OILING DEVICE

Wallace K. Newcomb, Easton, Pa., assignor to Ingersoll-Rand Company, Jersey City, N. J., a Corporation of New Jersey Application March 1, 1932. Serial No. 596,021

2 Claims. (Cl. 184—6)

This invention relates to reciprocatory engines, but more particularly to an oiling device for wrist pins of engines of this type.

One object of the invention is to assure an ample supply of lubricant to the cooperating surfaces of the wrist pin and its bearings.

Another object is to minimize the weight of the piston assembly.

Other objects will be in part obvious and in part pointed out hereinafter.

Figure 1:
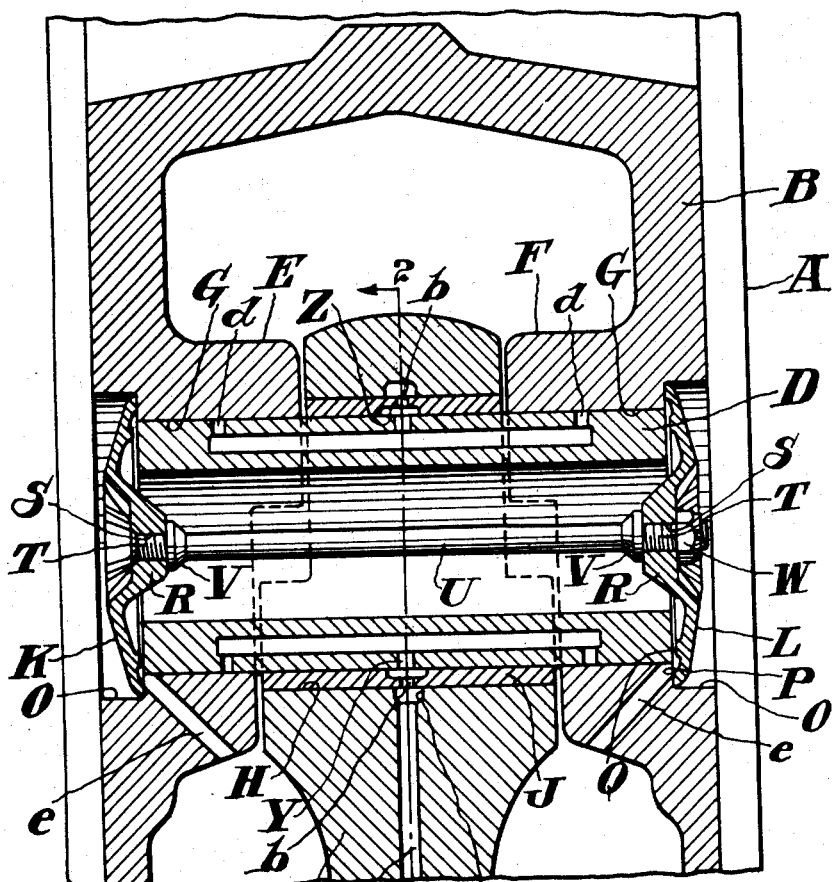
Figure 2:
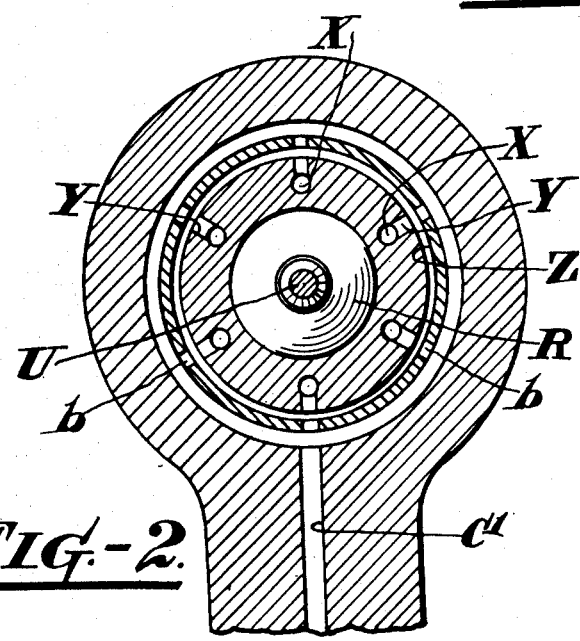

In the accompanying drawing illustrating the invention and wherein similar reference characters refer to similar parts, Figure 1 is a sectional elevation of a cylinder and its piston in which the wrist pin is equipped with an oilng devce constructed in accordance with the practice of the invention, and Figure 2 is a transverse view taken through Figure 1 on the line 2—2 looking in the direction indicated by the arrows.

Referring more particularly to the drawing, A designates a cylinder, which may be that of an internal combustion engine, and B designates a piston which is reciprocable in the cylinder A and has connected thereto a connecting rod C, as by means of a wrist pin D.

Within the piston B are the usual diametrically opposed bosses E and F between which the end of the connecting rod C is arranged. In the bosses E and F are apertures G to receive the ends of the wrist pin D. Likewise, in the connecting rod C is a bore H through which the intermediate portion of the wrist pin D extends. As a preferred form of construction, a bushing J is disposed in the bore H to serve as a bearing surface for the wrist pin.

The wrist pin D is of the hollow open ended type and is preferably free-floating in the bushing J and the bores G. Any convenient means may be provided for limiting its movement longitudinally. The means illustrated consist of a pair of plates K and L disposed in recesses O at the outer ends of the bores G.

The plates K and L are shown as being in the form of dished disks. Each plate is provided on its inner surface with a pair of concentrically arranged flanges P and Q. The flange P, which is the outer flange, seats against the bottom of the recess O to form a fluid tight joint at that point for preventing leakage of oil into the exterior portion of the recess O. The face of the flange Q is slightly off-set with respect to the flange P to provide a small degree of clearance between the disk and the end of the wrist pin for which it acts as an abutment.

In order to assure the retention of the disks K and L in the correct operative positions said disks are provided with central bosses or hubs R having threaded apertures S to accommodate the threaded ends T of a rod U which extends through the wrist pin D. Between the body portion of the threaded ends of the rod U are collars V which seat against the inner ends of the hubs R. Preferably the ends S of the rod U is peined over to permanently affix the rod to the plate K, and the end T of the rod extends through the disk L a sufficient distance to receive thereon a nut W whereby the disk L may be securely locked to the rod.

In accordance with the present invention, the wrist pin D is provided with a plurality of longitudinally extending supply passages X for lubricant which may be admitted into the supply passages through lateral supply ports Y in the wrist pin D and opening from the exterior thereof. The supply ports Y may, as illustrated, be located on the transverse median line of the wrist pin D and are in constant communication with an internal annular groove Z in the bushing J. The bushing J is, moreover, provided with a series of lateral ports b which communicate at one end with the groove Z and at their other ends with an annular groove c in the connecting rod C. Extending longitudinally of the connecting rod C is a passage C' which may be in communication with a source of oil supply (not shown) under pressure, as is customary in devices of this character.

The supply passages X are of less length than the wrist pin D and are provided at their terminals with discharge ports d through which oil flows to the cooperating surfaces of the wrist pin D and the bores G.

As a preferred form of construction the passages X are arranged in equally spaced radial planes in the wall of the wrist pin and consist of more than two in number so that one or more of said passages will at all times lie above the longitudinal axis of the wrist pin.

In order to provide a convenient path for the escape of any oil which may flow outwardly along the cooperating surfaces of the wrist pin and the bores G and thus prevent the accumulation of oil in the interior of the wrist pin, the bosses E and F are provided with drain passages e. The passages e in the present instance communicate at one end with the space between the flanges P and Q of the disks L and K and at their other ends with the interior of the piston B. In this way any oil which may find its way to the ends of the wrist pin D will be drained into the crank case of the engine.

During the operation of the device oil flows from the passage C' through the ports b into the annular groove Z, thence through the supply ports Y into the supply passages X to maintain said supply passages fully charged with oil. From the supply passages X the oil flows through the discharge ports d to lubricate the cooperating portions of the wrist pin D and the bores G in the bosses E and F. The portion of the wrist pin D which lies within the bushing J will be lubricated by oil supplied thereto from the groove Z.

From the foregoing description it will be readily seen that the entire exterior surface of the wrist pin D and the cooperating surfaces of the piston B and the connecting rod C may be thoroughly lubricated and that an ample supply of lubricant will at all times be available for this purpose. It will, moreover, be apparent that this result may be brought about without increasing the weight of the assembly above that of an ordinary hollow wrist pin, as would be the case were the interior of the wrist pin employed as an oil reservoir.

I claim:

1. An oiling device, comprising a hollow wrist pin having a plurality of longitudinally extending supply passages lying in different radial planes in the wall thereof and lateral supply and discharge ports for the passage and being spaced along the length of the wrist pin, and means for supplying oil to the supply passages.

2. An oiling device, comprising a hollow wrist pin having a plurality of longitudinally extending supply passages lying in equally spaced radial planes in the wall thereof and lateral supply ports leading from the periphery of the wrist pin to the passages for conveying oil into the passages, said wrist pin having discharge ports between the supply ports and the extremities of the wrist pin for conveying oil from the supply passages to the periphery of the wrist pin, and means for supplying oil to the supply passages.

WALLACE K. NEWCOMB.